Patented May 3, 1949

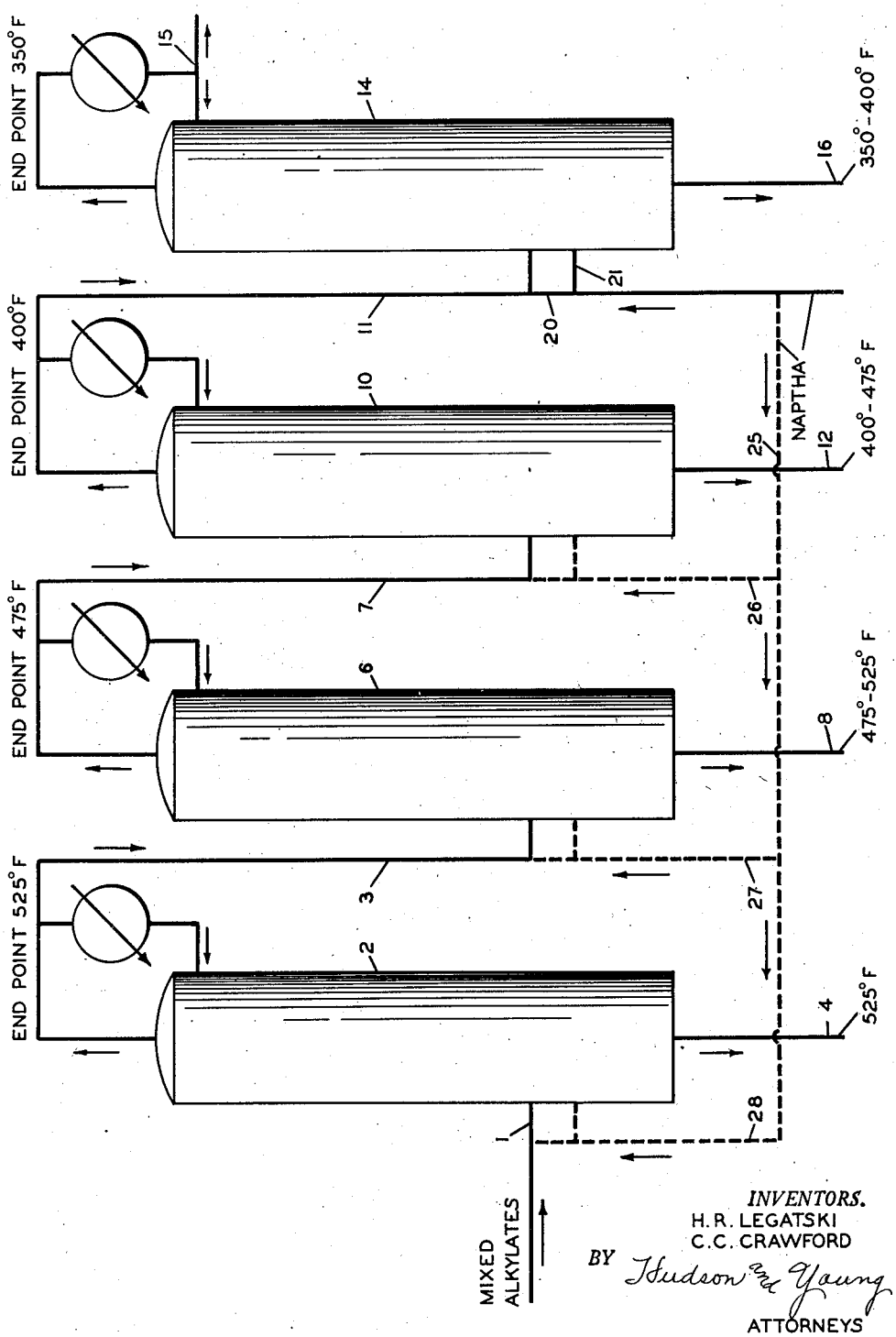

2,468,986

UNITED STATES PATENT OFFICE 2,468,986

PREPARATION OF ODORLESS FRACTIONS OF HIGHLY BRANCHED PARAFFINS

Harold R. Legatski and Chester C. Crawford, Bartlesville, Okla., assignors to Phillips Petroleum Company, a corporation of Delaware Application September 17, 1945, Serial No. 616,930

2 Claims. (Cl. 196—73)

This invention relates to improvements in methods of separating mixtures of highly branched paraffin hydrocarbons into fractions of desired boiling range which are odorless or have so little odor as to be unobjectionable when such fractions are used as solvents.

In alkylation processes for the production of high octane motor fuels, wherein isobutane and an olefin are reactants, and in processes for the manufacture of diisopropyl considerable quantities of alkylates which have boiling ranges overlapping and above the motor fuel range are obtained as by-products. When it is attempted to fractionally distill these by-products into fractions of suitable boiling range for use as solvents in dry cleaning, printer's inks, paints and insecticides it is found that the odors of the alkylate fractions obtained by the usual processes of distillation make them unfit for use in the above commercial applications.

In the dry cleaning, paint and insecticide industries odors of solvents are especially objectionable. If alkylate fractions are to be sold to these industries the fractions must not only have the required solvent properties and boiling range but must be able to compete successfully with deodorized straight run naphthas on the basis of odor.

The synthetic, branched-chain paraffin hydrocarbons, made by catalytic processes such as alkylation, or polymerization of olefins followed by hydrogenation, are hydrocarbons having characteristically very low odor intensity. It is common practice in the manufacture of these compounds to subject the feed stocks to a very high degree of purification in order to obtain maximum catalyst life. Such purification of feed stocks also results in synthetic hydrocarbon products which are almost entirely free from sulfur, nitrogen, oxygen and other contaminants and which are almost odorless.

When the products resulting from catalytic alkylation processes for the production of high octane motor fuel are distilled to remove the alkylates boiling in the motor fuel range a mixture of high boiling alkylates is obtained as a kettle product. This by-product is practically without any odor at all but it develops disagreeable odor on aging, or on boiling. When fractions of any desired boiling range are distilled from this fresh, odorless mixture the resulting distillates are found to have rancid, disagreeable odors which make them unfit for use as solvents in the industries mentioned above. This is true whether the distillation is performed batchwise or continuously; at atmospheric pressure, with steam, or under vacuum.

This unexpected result has led to numerous unsuccessful attempts to remove the odor from such distillates. These have included processes of blowing the distillate with air, blowing it with nitrogen, blowing it with carbon dioxide, extracting the distillate with alkali, refluxing the distillate in the presence of solid caustic, percolating the distillate through fuller's earth. None of these processes have yielded a product having odor characteristics necessary in a solvent merchantable to the above-mentioned industries.

The reactions by which odorous compounds are formed during such distillation or aging are not completely understood but it is believed that such reactions are due to the large number of secondary and/or tertiary carbon atoms present. It is known that olefin formation is not the cause of odor in the distillate since the bromine number of the hydrocarbon is not increased by distillation.

It is a principal object of our invention to provide a method for separating mixtures of highly branched paraffin hydrocarbons, boiling at temperatures above, but partially overlapping the motor fuel range, into fractions of desired boiling range which have so little odor as to be suitable for use as solvents in paints, insecticides and in the dry cleaning art.

Numerous other objects and features of novelty will become apparent to those skilled in the art as this disclosure proceeds.

Our invention consists of the unexpected discovery that while the odorous compounds formed during the distillation of such mixtures of highly branched paraffins are present in any condensate of overhead vapors, yet kettle products from which large quantities of vapors have been evolved are free from odor; a novel application of known procedures by which fractions of any desired boiling range may be withdrawn as kettle products, and a method for producing larger quantities of vapors than those evolved by distilling the mixture of highly branched paraffins, when such large quantities of vapor are desirable.

Apparently the reactions by which the odorous materials are formed involve oxidation and in the presence of dissolved oxygen in the incoming feed to the distillation system these reactions are continuing ones. Under such circumstances odorous products which are sufficiently volatile to be carried onward by the vapor stream are formed but odor cannot be eliminated overhead by increasing the degree of fractionation because the dissolved oxygen present in the incoming feed furnishes the condition essential for the formation of additional odorous products. This is a theoretical attempt to explain this unusual behavior of these hydrocarbons but we do not wish to confine or limit our invention to any theory or mechanism of chemical action. We have found that under such conditions any cut of distillate through which vapor passes, as it does on a plate of a fractionation column, is odorous; while a kettle product from which large quantities of vapors have been evolved is without objectionable odor.

Our invention may be better understood by reference to the accompanying drawing which shows diagrammatically one illustrative embodiment thereof.

A mixture of highly branched paraffin hydrocarbons such as that recovered as kettle product from the distillation of alkylates boiling in the motor fuel range is fed via line 1 to the first of a series of fractionating towers. These fractionating towers 2, 6, 10, and 14 are operated at progressively lower temperatures, and/or at successively higher pressures.

From each fractionating tower of the series the overhead vapors are conducted via lines 3, 7 and 11 respectively, to serve as feed for the tower operating at the next lower temperature, or higher pressure and are introduced into the medial portion of such next tower. A kettle product of desired boiling range is withdrawn from each tower via lines 4, 8, 12, and 16, respectively.

It is obvious that the number of towers in this series may be increased or diminished according to the number of cuts of product desired; and that the towers may be operated at any series of successively lower end point temperatures or higher pressures that may be required. The four end point temperatures illustrated merely indicate four commercially desirable cuts of product, when pressures in the towers are approximately equal.

When it is desired to prepare a fraction having a boiling range below 400° F. from a feed comprising the kettle product obtained by distilling off products boiling in the motor fuel range from the total products of an alkylation reaction it may be found that such feed does not contain enough low boiling materials to produce sufficient vapors to carry the odorous materials off overhead. In such case we have found that the introduction of low boiling naphtha via lines 20 and 21 will furnish vapors sufficient to drive the odorous materials off overhead without imparting objectionable odor to the kettle product. The naphtha so introduced is recovered as an odorous overhead product and may be conducted via line 15 to storage for any use where odor is not objectionable.

It is obvious that naphtha of suitable boiling range may also be introduced into any tower of the series wherein increased evolution of vapors and/or increased vapor scrubbing effect may be found desirable. This may be accomplished by passing the naphtha through lines 25, 26, 27, and/or 28 as indicated by the dotted lines.

Kettle products withdrawn via lines 4, 8, 12, and 16 are practically odorless when freshly prepared. Upon boiling or prolonged aging these products are found to develop odor. However, no further treatment is necessary when these kettle products are to be used within a few months, and if they are to be stored for a longer time before use, the development of odor may be inhibited by any suitable means.

While in the description of the process we have emphasized its application to the kettle product obtained by distilling off alkylates boiling in the motor fuel range, it is obvious that our invention is applicable to any mixture of high boiling, highly branched paraffins, however obtained. The highly branched character of the paraffin, associated with large numbers of tertiary and/or secondary carbon atoms, is all that is necessary to cause the overhead products to be odorous and the practice of our invention will result in desired fractions of such paraffins wherein the odors are unobjectionable.

It is also obvious that a single fractionating tower might be used where the object is merely to prepare an odorless fraction which has a desired minimum boiling point when the upper limit of the boiling range is of no moment.

The highly branched paraffin hydrocarbon feed used in the present invention is commonly made by catalytic alkylation of low boiling isoparaffins with low boiling olefins employing a suitable alkylation catalyst, generally with concentrated sulfuric acid or substantially anhydrous hydrofluoric acid. It may be made by alkylation of isobutane with ethylene to give chiefly diisopropyl. This type of alkylation is generally effected with an aluminum chloride containing catalyst promoted with small amounts of hydrogen chloride. A method of preparing diisopropyl in such manner is shown in the copending application of Clarence R. Ringham, Serial No. 556,208, filed September 28, 1944, now Patent 2,409,389, issued October 15, 1946.

The term "inert substantially odorless gas" as used in this specification refers to any gas or mixture of gases which is substantially odorless and which is inert insofar as reactions resulting in formation of odorous compounds from highly branched paraffin hydrocarbons are concerned.

We are aware that fractional distillation has been conducted in a series of fractionating towers in such manner as to yield fractions of desired boiling range as kettle products prior to our invention.

We claim:

1. An improved process for producing an odorless branched-chain paraffin hydrocarbon fraction boiling from 350 to 400° F. from an olefin-free paraffinic charge stock containing same and also higher-boiling and lower-boiling branched-chain paraffin hydrocarbons, said stock being free from sulfur and nitrogen contaminants and containing oxygen, which comprises subjecting such a charge stock to fractional distillation and removing therefrom an odorous distillate comprising said desired 350 to 400° F. fraction and lower-boiling paraffin hydrocarbons, introducing a stream of said odorous distillate into an intermediate point of a fractional distillation column, withdrawing from said column as a distillate an odorous stream of paraffin hydrocarbons boiling below 350° F., and removing as a kettle product from said column an odorless fraction boiling from 350 to 400° F. as a product of the process.

2. An improved process for producing an odorless branched-chain paraffin hydrocarbon fraction boiling from 350 to 400° F. from an olefin-free paraffinic charge stock containing same and also higher-boiling and lower-boiling branched-chain paraffin hydrocarbons, said charge stock being free from sulfur and nitrogen contaminants and containing oxygen, which comprises subjecting such a charge stock to fractional distillation and removing therefrom an odorous distillate comprising said desired 350 to 400° F fraction and lower-boiling paraffin hydrocarbons, introducing a stream of said odorous distillate into an intermediate point of a fractional distillation column together with a naphtha fraction which is sufficiently low-boiling to be recovered in the overhead distillate fraction from said column, withdrawing from said column as a distillate an odorous stream of paraffin hydrocarbons boiling below 350° F., and removing as a kettle product from said column an odorless fraction boiling from 350 to 400° F. as a product of the process.

HAROLD R. LEGATSKI.
CHESTER C. CRAWFORD.

REFERENCES CITED

The following references are of record in the file of this patent:

UNITED STATES PATENTS

| Number | Name | Date |
|---|---|---|
| 1,955,246 | Link | Apr. 17, 1934 |
| 1,957,818 | Carney | May 8, 1934 |
| 1,988,061 | Wagner | Jan. 15, 1935 |
| 2,111,259 | Blengsli | Mar. 15, 1938 |
| 2,160,103 | Kraft et al. | May 30, 1939 |
| 2,286,504 | Parker | June 16, 1942 |
| 2,405,393 | Atkins | Aug. 6, 1946 |